(12) United States Patent
Miao et al.

(10) Patent No.: US 10,705,536 B2
(45) Date of Patent: Jul. 7, 2020

(54) METHOD AND SYSTEM TO MANAGE VEHICLE GROUPS FOR AUTONOMOUS VEHICLES

(71) Applicant: Baidu USA LLC, Sunnyvale, CA (US)

(72) Inventors: Jinghao Miao, Sunnyvale, CA (US);
Liyun Li, Sunnyvale, CA (US);
I-Hsuan Yang, Sunnyvale, CA (US);
Shiyuan Fang, Sunnyvale, CA (US);
Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 396 days.

(21) Appl. No.: 15/359,463

(22) Filed: Nov. 22, 2016

(65) Prior Publication Data
US 2018/0143649 A1 May 24, 2018

(51) Int. Cl.
*B60W 60/00* (2020.01)
*G05D 1/02* (2020.01)
*G08G 1/00* (2006.01)
*G05D 1/00* (2006.01)
*H04L 29/08* (2006.01)

(52) U.S. Cl.
CPC ............ *G05D 1/0291* (2013.01); *B60W 60/00* (2020.02); *B60W 60/0013* (2020.02); *B60W 60/0027* (2020.02); *G05D 1/0088* (2013.01); *G08G 1/22* (2013.01); *H04L 67/12* (2013.01); *B60W 60/00136* (2020.02)

(58) Field of Classification Search
None
See application file for complete search history.

(56) References Cited

U.S. PATENT DOCUMENTS 8,284,748 B2 * 10/2012 Borghei ............... H04W 4/021
370/338
9,451,020 B2 * 9/2016 Liu ....................... H04W 76/10
2016/0003637 A1 * 1/2016 Andersen ........... G01C 21/3617
701/519

* cited by examiner

*Primary Examiner* — Abby Y Lin
*Assistant Examiner* — Edward Torchinsky
(74) *Attorney, Agent, or Firm* — Womble Bond Dickinson (US) LLP

(57) ABSTRACT

Route segment information is received from a first autonomous vehicle over a network. The route segment information includes one or more route segments and estimated entrance times, each of the entrance times being associated with one of the route segments and representing a time the first autonomous vehicle enters the route segment. Whether the first autonomous vehicle is within a specific route segment is determined based on an entrance time associated with the specific route segment and a current location of the first autonomous vehicle. If the first autonomous vehicle is within the specific route segment, a request is sent to invite the first autonomous vehicle to join a vehicle group of one or more vehicles associated with the specific route segment. The vehicle group is one of a plurality of vehicle groups that were determined based on route segment information received from a plurality of autonomous vehicles.

18 Claims, 9 Drawing Sheets

METHOD AND SYSTEM TO MANAGE VEHICLE GROUPS FOR AUTONOMOUS VEHICLES

TECHNICAL FIELD

Embodiments of the present invention relate generally to operating autonomous vehicles. More particularly, embodiments of the invention relate to managing vehicle groups for autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

However, conventional vehicles operating in autonomous mode do not provide the occupants the enjoyment they may desire while travelling in the vehicles. The conventional vehicles further do not leverage the occupants' free time during a trip to pursue economic or business opportunities.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
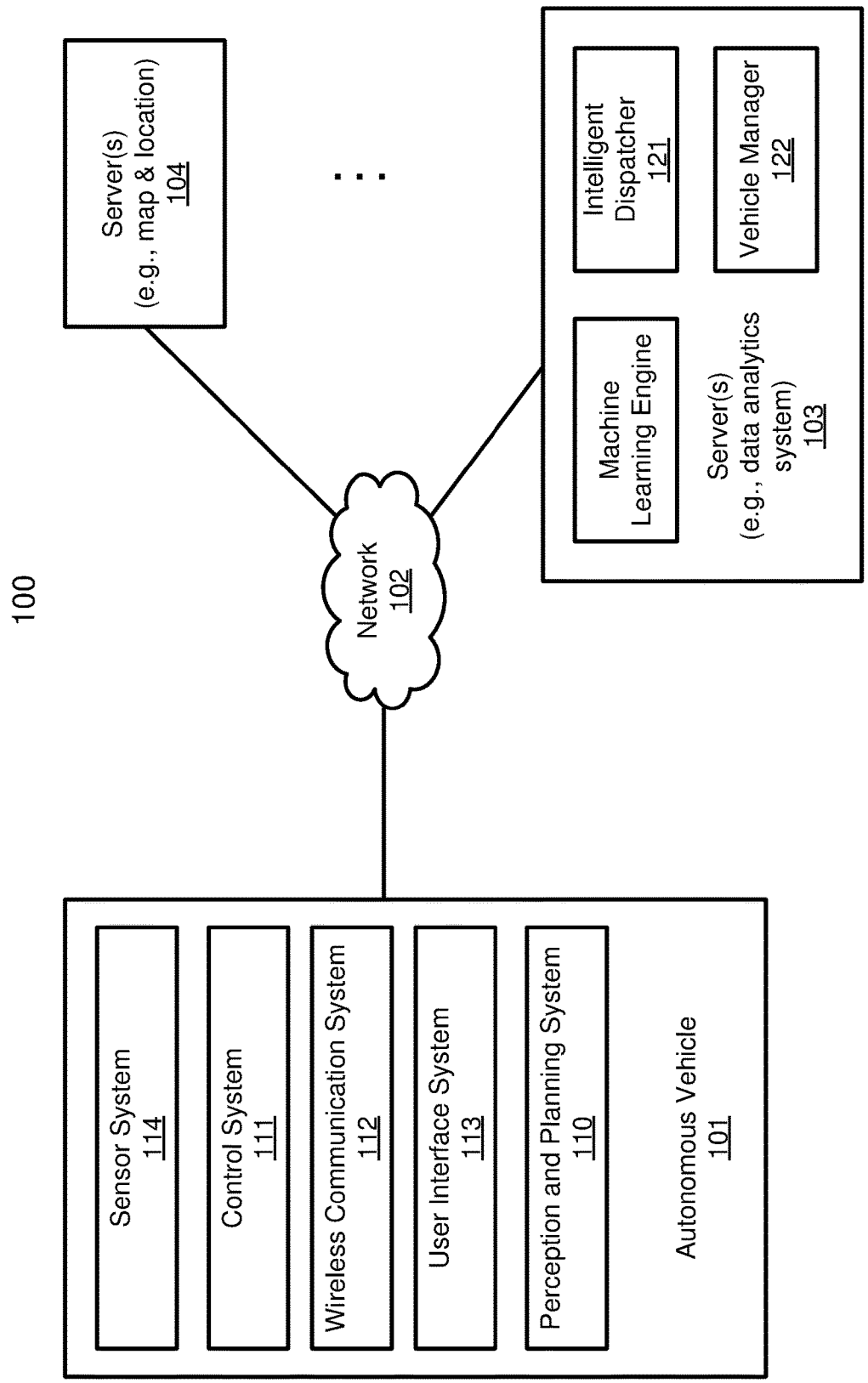
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, the system groups one or more autonomous vehicles based on an itinerary of each of the autonomous vehicles. The itinerary includes a route to a destination from a starting point. The route includes one or more route segments and one or more points of interest (e.g., local businesses, attractions, schools, churches, etc.). By grouping the autonomous vehicles, the system builds connections among the passengers of the vehicles who travel on at least one common route segment within their itineraries. The passengers could interact with each other, for example to share information relating to their trips, through a social community provided by the vehicle group.

In one embodiment, route segment information is received from a first autonomous vehicle over a network. The route segment information includes one or more route segments and estimated entrance times, each of the entrance times being associated with one of the route segments and representing a time the first autonomous vehicle enters the route segment. Whether the first autonomous vehicle is within a specific route segment is determined based on an entrance time associated with the specific route segment and a current location of the first autonomous vehicle. If the first autonomous vehicle is within the specific route segment, a request is sent to invite the first autonomous vehicle to join a vehicle group of one or more vehicles associated with the specific route segment. The vehicle group is one or more vehicle groups that were determined based on route segment information received from a number of autonomous vehicles, where each vehicle group is associated with a specific route segment.

In one embodiment, an itinerary is obtained responsive to an input destination. The itinerary includes a route to the input destination. The route has a number of points of interest. The route is segmented into a number of route segments based on the points of interest and location and map information. The route segment information is transmitted to a remote server over a network. The remote server receives route segment information from a number of autonomous vehicles over the network. A vehicle group identifier (ID) is received, with the vehicle group ID identifying a group of one or more vehicles nearby from the remote server. The remote server determined a number of vehicle groups based on the route segment information received from the number of autonomous vehicles. In response to the vehicle group ID, the group of one or more nearby vehicles is joined to allow passengers of the nearby vehicles to communicate with each other.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
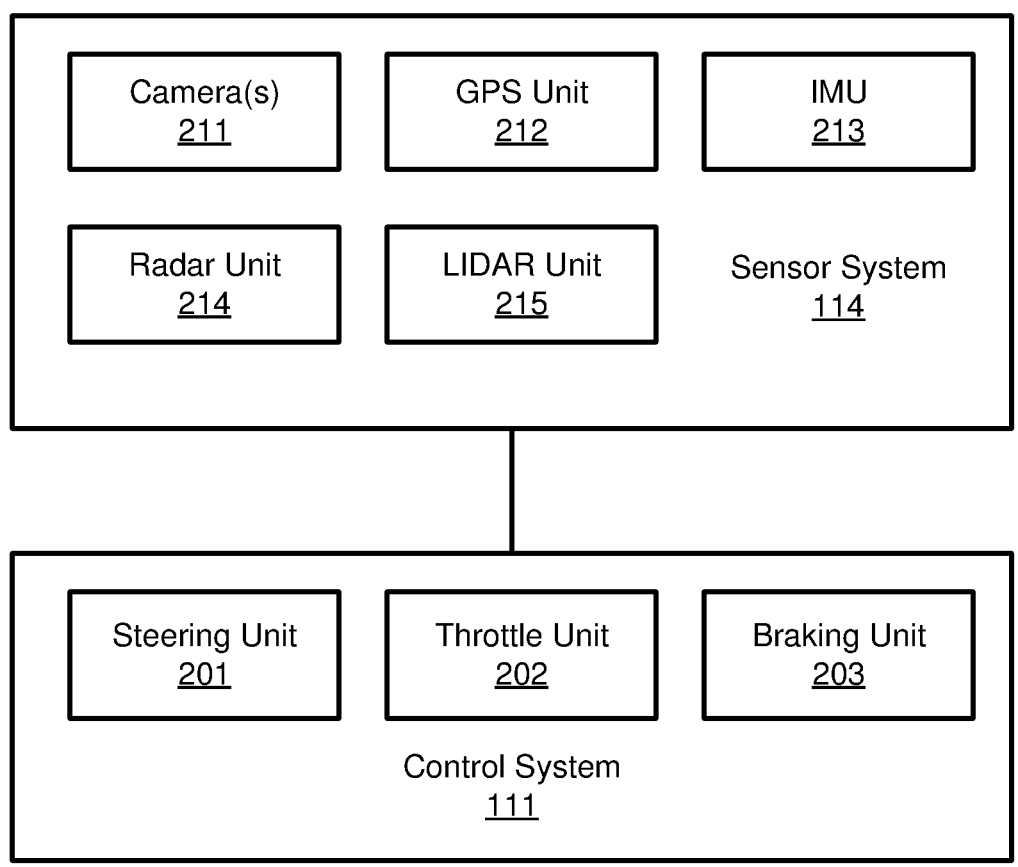
FIG. 2 is a block diagram illustrating an example of an autonomous vehicle according to one embodiment of the invention.

Referring now to FIG. 2, in one embodiment, sensor system 114 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 114 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 114 (e.g., obstacles, objects, nearby vehicles), perception and planning system 110 can plan an optimal route and drive vehicle 101, for example, via control system 111, according to the planned route to reach the specified destination safely and efficiently.

According to one embodiment, as illustrated in FIG. 1, the server 103 includes an intelligent dispatcher 121 and a vehicle manager 122. The intelligent dispatcher 121 decides whether to assign an autonomous vehicle to one or more vehicle groups. The vehicle manager 122 manages one or more vehicle groups and their associated vehicles.

In one embodiment, based on route segment information and a current location of the autonomous vehicle, the intelligent dispatcher 121 may determine whether the vehicle is within a specific route segment within a route. If so, the intelligent dispatcher 121 may send a request to invite the vehicle to join a vehicle group associated with the specific route segment. However, if the vehicle was within the specific route segment and has left, the intelligent dispatcher 121 may request that the vehicle be removed from the vehicle group.

In one embodiment, if a passenger of the autonomous vehicle accepts the invitation to join a particular vehicle group, the vehicle manager 122 serves to place the vehicle in the particular vehicle group. On the other hand, the vehicle manager 122 may remove the vehicle from the vehicle group if such a request is made, for example, from the intelligent dispatcher 121.

Figure 3:
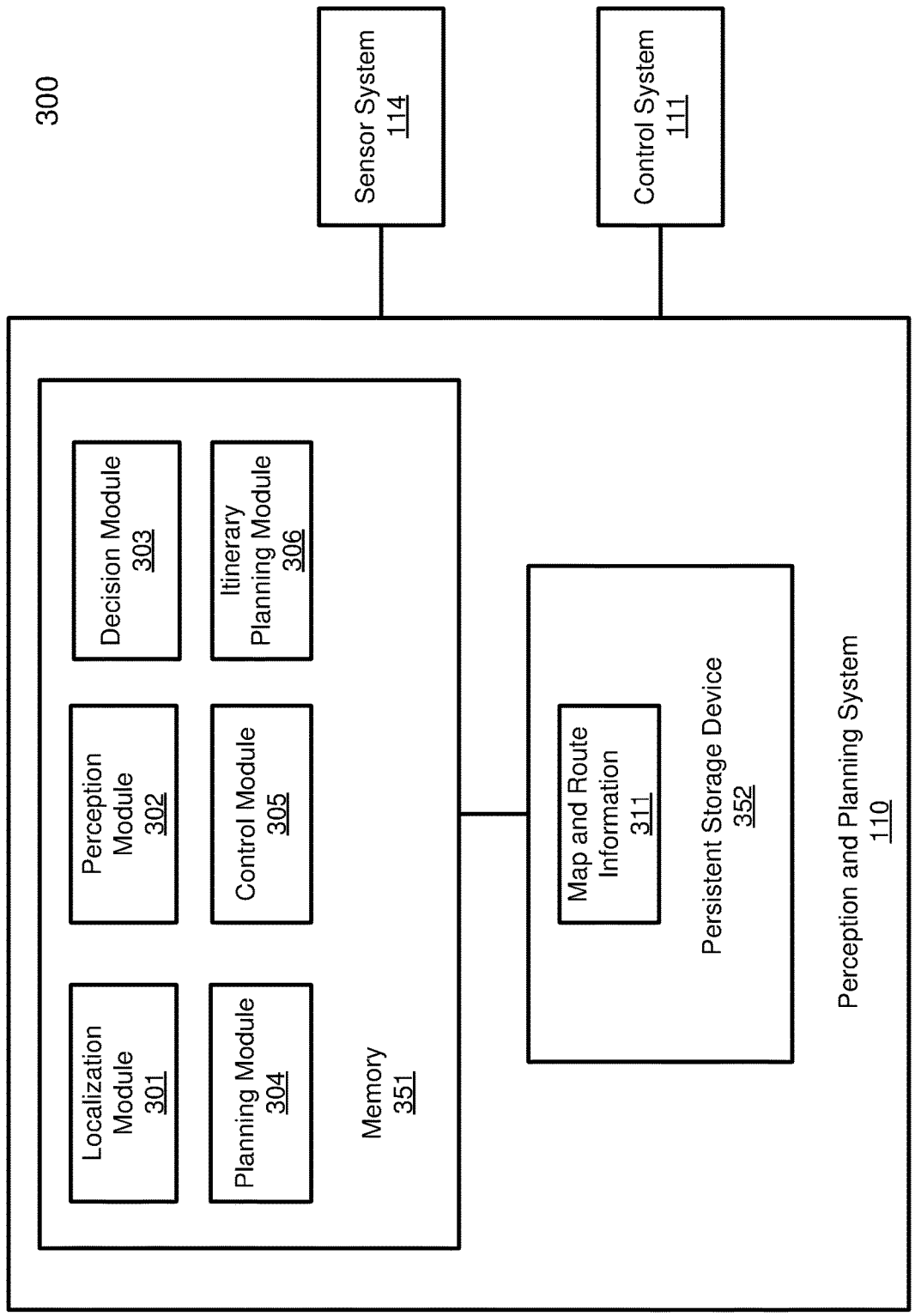
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 114. Referring to FIG. 3, perception and planning system 110 includes, but is not limited to, localization module 301, perception module 302, decision module 303, planning module 304, control module 305, itinerary planning module 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

The itinerary planning module 306 analyzes an itinerary of a trip. For example, a user or passenger may specify a starting location and/or a destination of a trip via a user interface such as the user interface system 113. Using the specified starting location and/or destination, the localization module 301 may form an itinerary having a route to the specified destination. The itinerary planning module 306 may obtain the itinerary from the localization module 301 and divide or segment the route into route segments and evaluate each of the route segments. The evaluated route segments may be sent, as route segment information, to a remote server (e.g., the server 103) via a network such as the network 102 for processing, for example by the intelligent dispatcher 121. In some embodiments, the starting location may be automatically provided or populated based on a current location provided, for example, by the GPS system 212 instead of being specified by the user. In some embodiments, the route may include a number of points of interest such as local businesses, attractions, schools, churches, etc.

Figure 4:
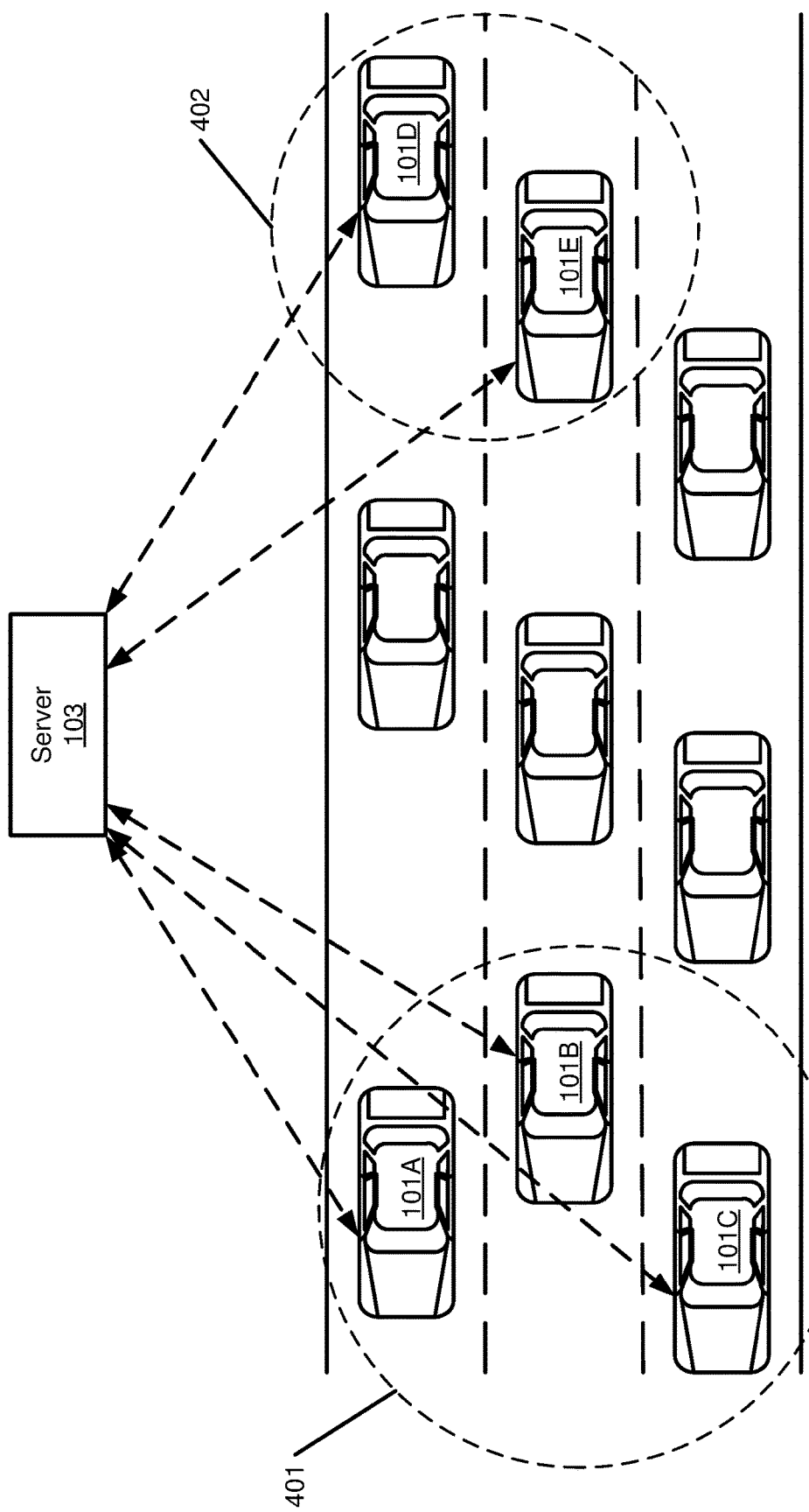
FIG. 4 is a diagram illustrating an example of vehicle groups of one or more autonomous vehicles according to one embodiment of the invention.

FIG. 4 is a diagram illustrating an example of vehicle groups of one or more autonomous vehicles according to one embodiment of the invention. Referring to FIG. 4, the autonomous vehicles 101A-E are communicatively coupled to the server 103 for sending and receiving information to and from the server 103, for example, over the network 102. Each of the autonomous vehicles 101A-E, for example, may send current location and route segment information to the server 103 and based on the information, the vehicle may receive a request from the server 103 to join a particular vehicle group. In the example of FIG. 4, the server 103 may determine that autonomous vehicles 101A-C are travelling on a common or same route segment during a particular time period based on the current location and route segment information. The server 103, therefore, may send each of the autonomous vehicles 101A-C a request to invite the vehicle to join a first vehicle group 401. Upon accepting the invitation, the autonomous vehicles 101A-C are assigned to the first vehicle group 401. This is similarly applied to autonomous vehicles 101D,E with respect to a second vehicle group 402 as illustrated in FIG. 4.

Figure 5:
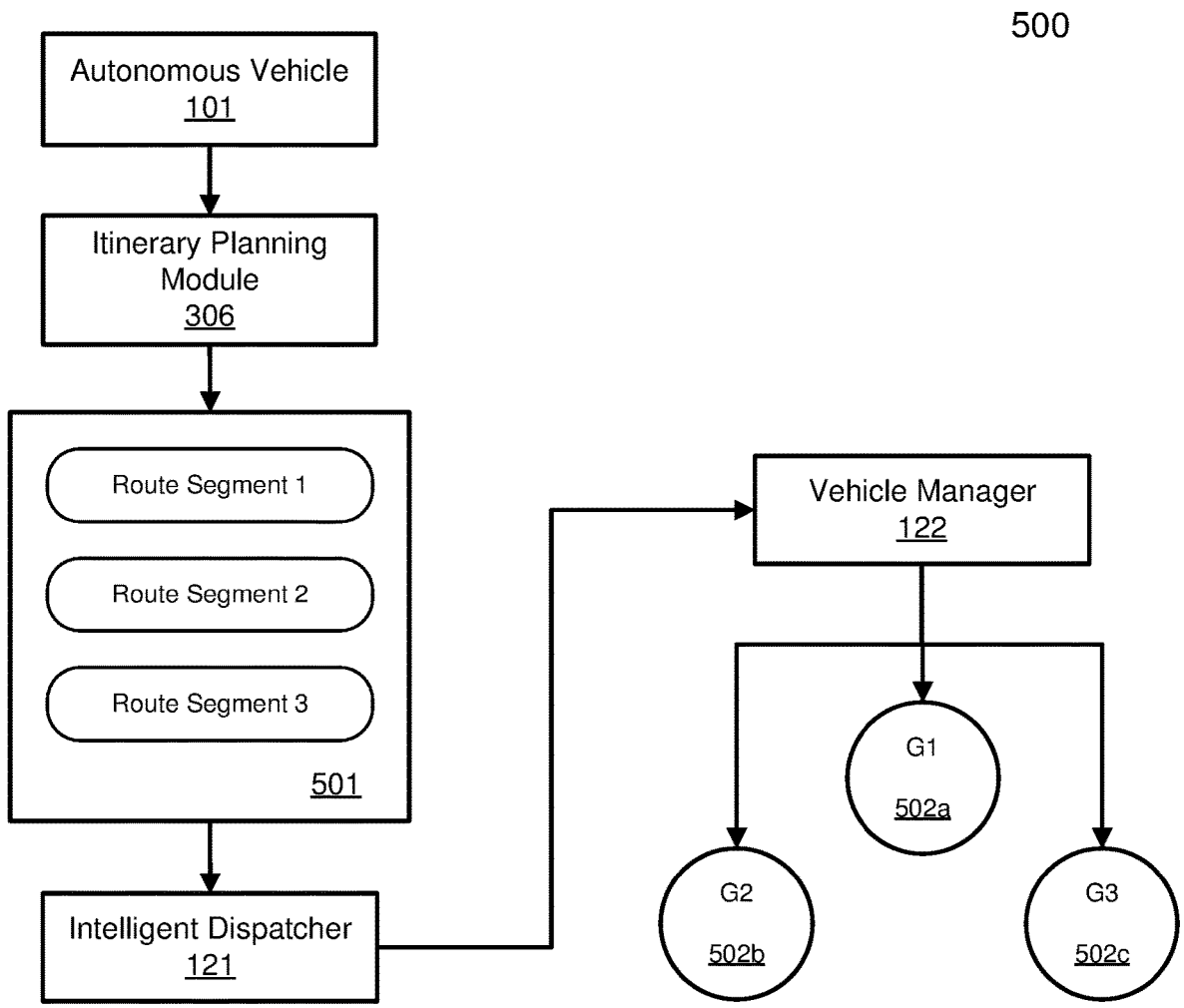
FIG. 5 is a block diagram illustrating an example of managing autonomous vehicles according to one embodiment of the invention.

FIG. 5 is a block diagram illustrating an example of managing autonomous vehicles according to one embodiment of the invention. In FIG. 5, a passenger or user of the autonomous vehicle 101 may start the engine and input a starting location and/or a destination of a trip. Based on the starting location and destination, the autonomous vehicle 101, via the localization module 301, may create an itinerary having a route to the destination, with the route including a number of points of interests.

The itinerary planning module 306 may receive the itinerary from the localization module 301 and segment (e.g., using a map API) the route into one or more route segments 501 based on the points of interest and location and map information (e.g., provided by the MPOI server). In some embodiments, for each of the route segments 501, the itinerary planning module 306 may compute or calculate an estimated entrance time that represents a time the autonomous vehicle 101 would enter the route segment. The estimated entrance time may be calculated, for example, based on a current time and a current location and speed of the autonomous vehicle 101. Subsequently, the route segments and their associated entrance times are transmitted, as route segment information, to the intelligent dispatcher 121, for example over the network 102.

The intelligent dispatcher 121 receives the route segment information and stores the information, for example, into a memory of a remote server. Based on an estimated entrance time associated with a specific route segment and a current location of the autonomous vehicle 101, the intelligent dispatcher 121 may determine, for example on a periodic basis, whether the autonomous vehicle 101 is travelling within the specific route segment. If so, the intelligent dispatcher 121 may send a request to invite the autonomous vehicle 101 to join a vehicle group (e.g., vehicle group 502a, 502b, or 502c) associated with the specific route segment. The request may be received by the perception and planning system 110 or a mobile device (e.g., smartphone, tablet) of the passenger. The passenger may accept the request using, for example, the user interface system 113 or the mobile device. Upon accepting the invitation, the intelligent dispatcher 121 may send a request or message (e.g., a "join-in" request) to the vehicle manager 122 for assigning the autonomous vehicle 101 to the vehicle group. On the other hand, the intelligent dispatcher 121 may send a request (e.g., a "leave" request) for removing the autonomous vehicle 101 from the vehicle group if it is determined that the vehicle has left or is no longer within the specific route segment.

The vehicle manager 122 manages and monitors a number of vehicle groups 502a-c and their associated autonomous vehicles. The vehicle manager 122, for example, may place or assign the autonomous vehicle 101 to one of the vehicle groups 502a-c when receiving the request message to assign the vehicle to the vehicle group. On the other hand, the vehicle manager may remove the autonomous vehicle 101 from the vehicle group when receiving the request message to remove the vehicle from the vehicle group. In some embodiments, the vehicle manager 122 may create or construct a vehicle group if there is no vehicle group currently associated with the specific route segment. In some embodiments, the vehicle manager 122 may terminate or deconstruct a vehicle group if there is no autonomous vehicle currently associated with the vehicle group.

Each of the vehicle groups 502*a-c* may provide a social community having social media features to connect passengers of one or more autonomous vehicles within the vehicle group. The vehicle group, in some embodiments, may provide a real-time communication channel (e.g., a chat) where passengers of autonomous vehicles within the vehicle group may generate content (e.g., text posts or comments, digital photos, videos) to share information with each other. For example, a passenger of a first autonomous vehicle, by way of the user interface system 113 or a mobile device, may compose and send a message to share or comment on various topics such as road and traffic conditions, points of interest, and/or his/her destination. The message may be received by the remote server (e.g., the server 103) from the first autonomous vehicle over a network such as the network 102. The remote server, in turn, may forward the message to a passenger of a second autonomous vehicle where the message may be displayed using the user interface system 113 of the second autonomous vehicle or a mobile device of the passenger of the second autonomous vehicle. In some embodiments, if the message is determined to be an offensive message, for example a message having indecent, obscene, or false information, the vehicle manager 122 may remove the passenger of the first autonomous vehicle, who authors the message, from the vehicle group.

In some embodiments, the vehicle group may enable the passengers to create their user profiles that are maintained by the remote server (e.g., by the vehicle manager 122). In other embodiments, the vehicle group instead may allow the passengers to import or incorporate their user profiles from a social networking site such as Facebook®, Twitter®, LinkedIn®, Pinterest®, etc. The user profiles, for example, may be used to connect one passenger with another passenger within the vehicle group. In some embodiments, the vehicle group may provide social gaming to the passengers. A passenger, for example, may download one or more video games from the remote server and play the video game(s) as a single player or multiple players (e.g., playing against another passenger). In various embodiments, the social media features may enable businesses to engage in marketing research, communication, sales promotions, and/or relationship development. For example, the perception and planning system 110 may receive media content (e.g., sponsored content or advertisements) from the remote server based on a point of interest (e.g., a local business) associated with the route segment corresponding to the group of vehicles. The media content may be identified and rendered by the remote server and presented to a passenger of the autonomous vehicle by way of a user interface such as the user interface system 113 or a mobile device of the passenger.

Figure 6:
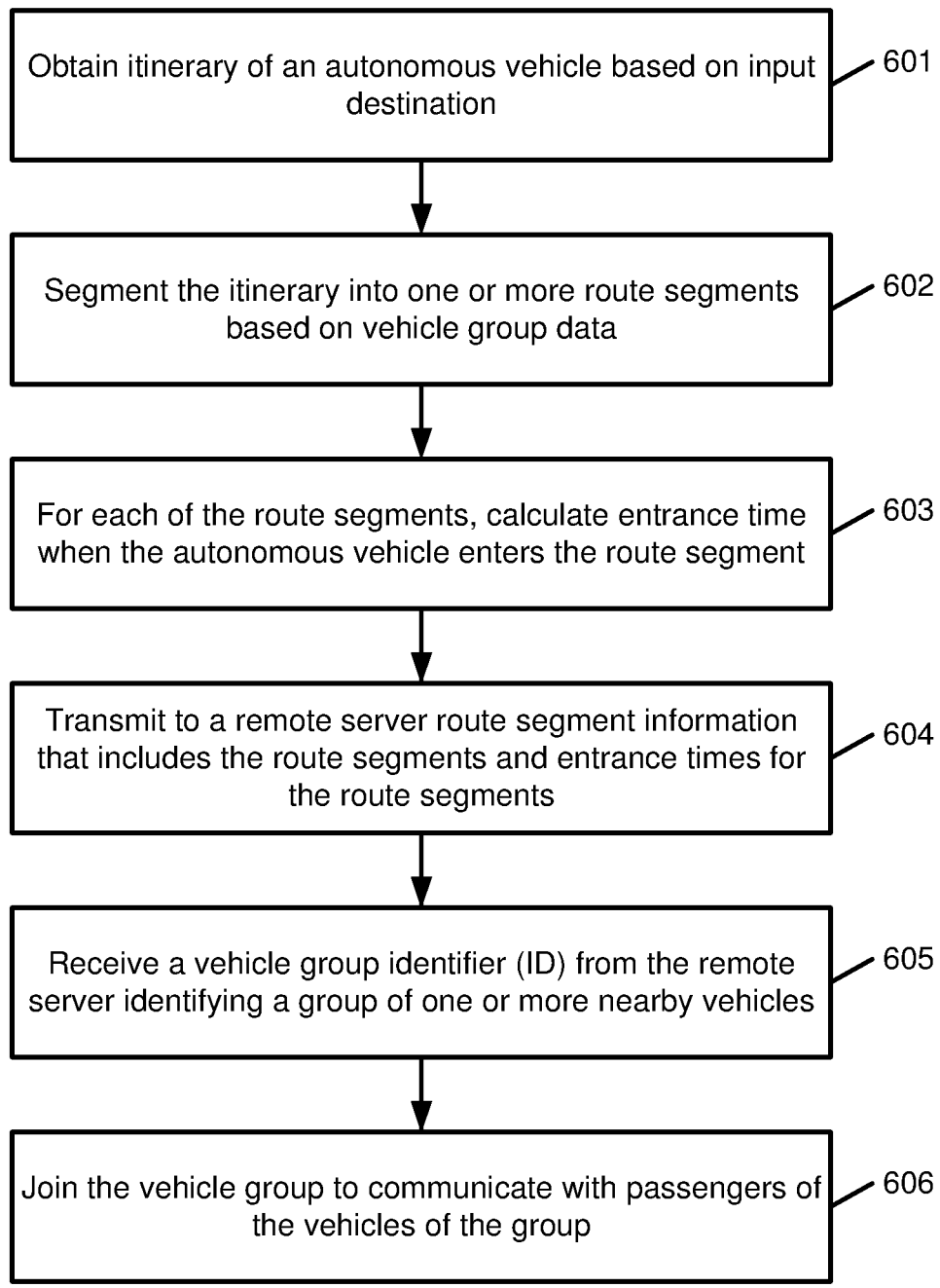
FIG. 6 is a flow diagram illustrating a process of operating an autonomous vehicle according to one embodiment of the invention.

FIG. 6 is a flow diagram illustrating a process of operating an autonomous vehicle according to one embodiment of the invention. Process 600 may be performed by processing logic which may include software, hardware, or a combination thereof. For example, process 600 may be performed by the perception and planning system 110 of FIG. 1.

Referring to FIG. 6, at block 601, the processing logic obtains an itinerary of an autonomous vehicle based on an input destination. At block 602, the processing logic segments the itinerary into one or more route segments based on vehicle group data (e.g., points of interest, location and map information). At block 603, the each of the route segments, the processing logic calculates an entrance time when the autonomous vehicle enters the route segment. At block 604, the processing logic transmits to a remote server (e.g., the server 103) route segment information that includes the route segments and the entrance times for the route segments. At block 605, the processing logic receives a vehicle group identifier (ID) from the remote server identifying a group of one or more nearby vehicles. At block 606, the processing logic joins the vehicle group to communicate with passengers of the vehicles of the vehicle group.

Figure 7:
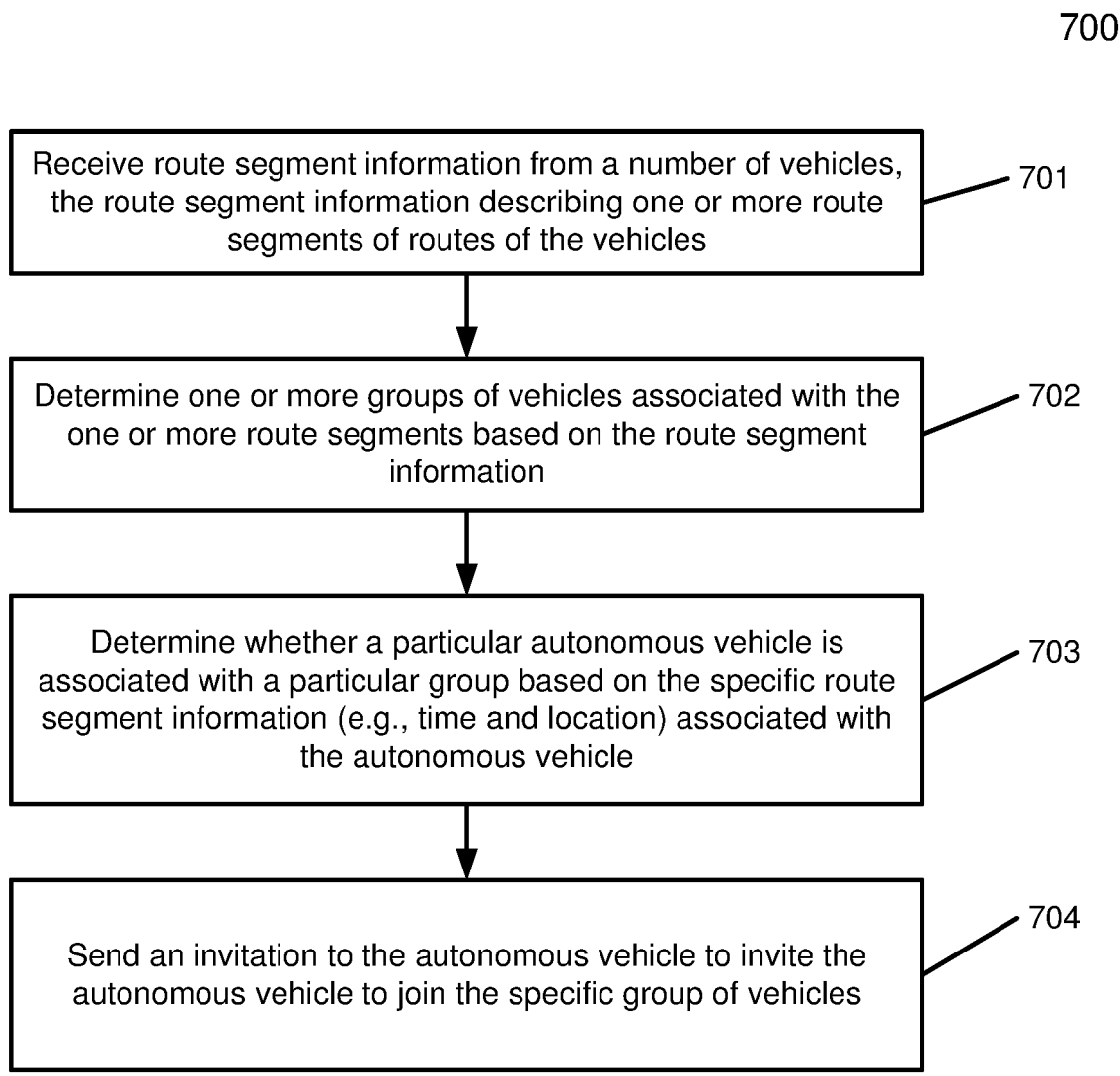
FIG. 7 is a flow diagram illustrating a process of managing autonomous vehicles according to one embodiment of the invention.

FIG. 7 is a flow diagram illustrating a process of managing autonomous vehicles according to one embodiment of the invention. Process 700 may be performed by processing logic which may include software, hardware, or a combination thereof. For example, process 700 may be performed by the server 103 of FIG. 1.

Referring to FIG. 7, at block 701, the processing logic receives route segment information (e.g., route segments, entrance times for route segments) from a number of autonomous vehicles. The route segment information may describe one or more route segments of routes of the vehicles. At block 702, the processing logic determines one or more groups of vehicles associated with the route segments based on the route segment information. At block 703, the processing logic determines whether a particular autonomous vehicle is associated with a particular group based on specific route segment information (e.g., time and location) associated with the autonomous vehicle. At block 704, the processing logic sends an invitation to the autonomous vehicle to invite the autonomous vehicle to join the specific group of vehicles.

Figure 8:
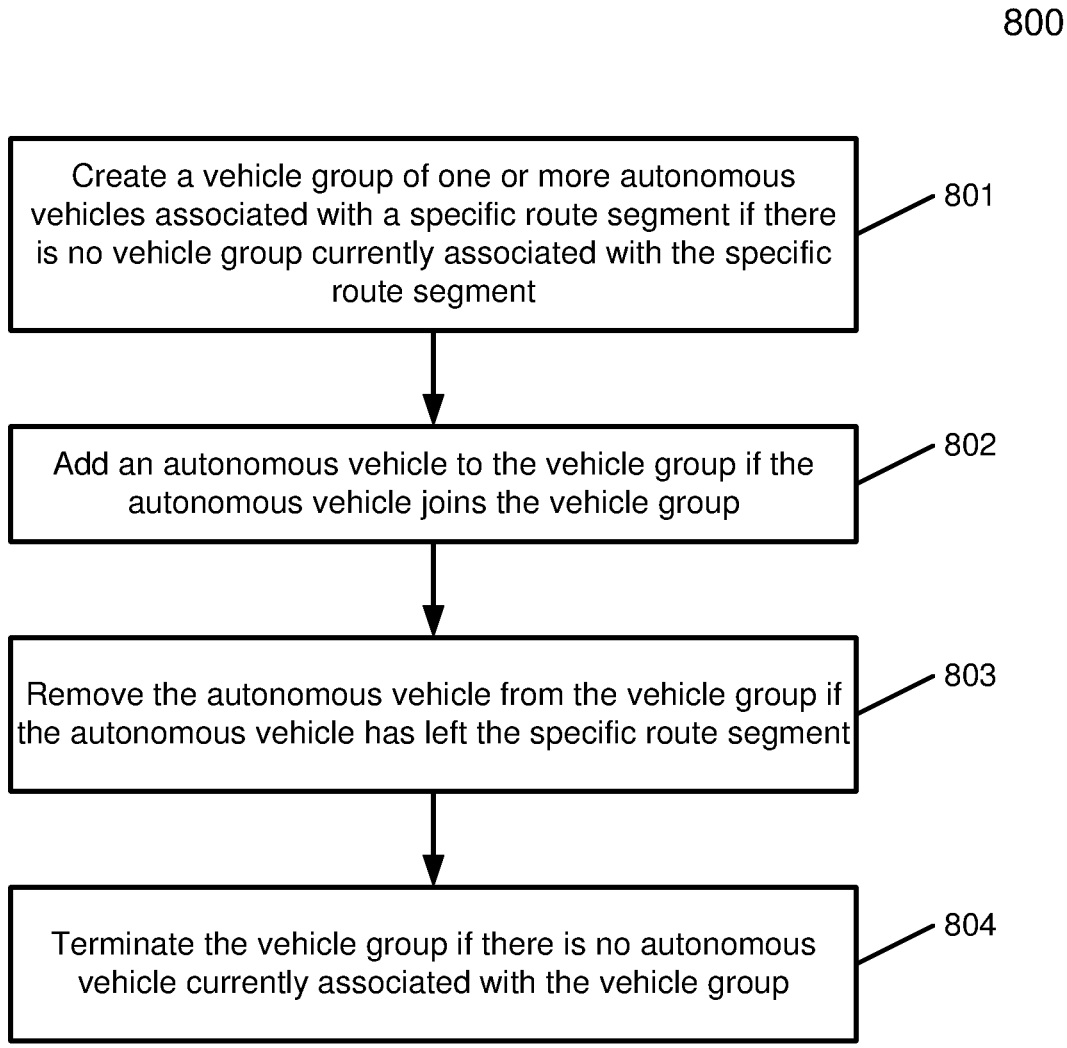
FIG. 8 is a flow diagram illustrating a further process of managing autonomous vehicles according to one embodiment of the invention.

FIG. 8 is a flow diagram illustrating a further process of managing autonomous vehicles according to one embodiment of the invention. Process 800 may be performed by processing logic which may include software, hardware, or a combination thereof. For example, process 800 may be performed by the server 103 of FIG. 1.

Referring to FIG. 8, at block 801, the processing logic creates a vehicle group of one or more autonomous vehicles associated with a specific route segment if there is no vehicle group currently associated with the specific route segment. At block 802, the processing logic adds an autonomous vehicle to the vehicle group if the autonomous vehicle joins the vehicle group. At block 803, the processing logic removes the autonomous vehicle from the vehicle group if the autonomous vehicle has left the specific route segment. At block 804, the processing logic terminates the vehicle group if there is no autonomous vehicle currently associated with the vehicle group.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
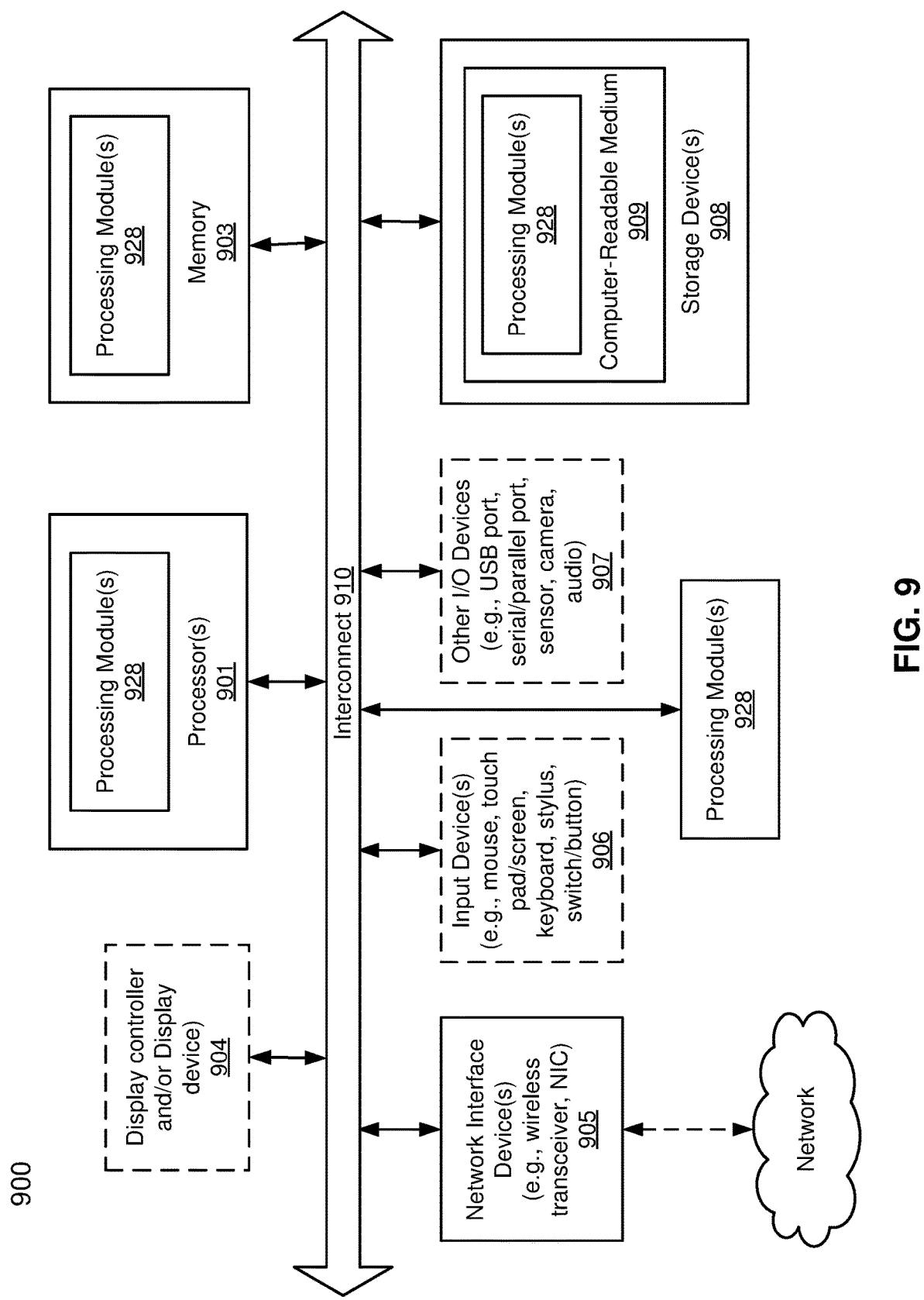
FIG. 9 is a block diagram illustrating a data processing system according to one embodiment.

FIG. 9 is a block diagram illustrating an example of a data processing system which may be used with one embodiment of the invention. For example, system 900 may represent any of data processing systems described above performing any of the processes or methods described above, such as, for example, data processing system 110 or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 900 may further include 10 devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor

901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, planning module 304, control module 305, or itinerary planning module 306. Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing autonomous driving vehicles, the method comprising:
   receiving route segment information from a first autonomous driving vehicle over a network, wherein the route segment information includes one or more route segments of a route to a destination and estimated entrance times, each of the entrance times being associated with one of the route segments and representing a time the first autonomous driving vehicle enters the route segment;
   determining whether the first autonomous driving vehicle is within a specific route segment based on an entrance time associated with the specific route segment and a current location of the first autonomous driving vehicle; and
   if the first autonomous driving vehicle is within the specific route segment, sending a request to invite the first autonomous driving vehicle to join a vehicle group of one or more autonomous driving vehicles that are traveling in a same route segment as the first autonomous driving vehicle, wherein the vehicle group is one of a plurality of vehicle groups that were determined based on route segment information received from a plurality of autonomous driving vehicles.

2. The method of claim 1, further comprising:
determining whether the first autonomous vehicle has left the specific route segment; and
if the first autonomous vehicle is no longer within the specific route segment, sending a request to the first autonomous vehicle to remove the first autonomous vehicle from the vehicle group.

3. The method of claim 2, further comprising:
receiving a message from a first passenger of the first autonomous vehicle over the network; and
forwarding the message to a second passenger of the second autonomous vehicle over the network.

4. The method of claim 1, further comprising:
creating the vehicle group if there is no vehicle group currently associated with the specific route segment; and
terminating the vehicle group if there is no autonomous vehicle currently associated with the vehicle group.

5. The method of claim 1, further comprising:
receiving a message from a first passenger of the first vehicle to be sent to a second passenger of a second vehicle of the vehicle group;
determining whether the message is an offensive message; and
removing the first passenger from the vehicle group in response to determining that the message is offensive.

6. A non-transitory machine-readable medium having instructions stored therein, which when executed by a processor, cause the processor to perform operations for forming a vehicle group for autonomous driving vehicles, the operations comprising:
receiving route segment information from a first autonomous driving vehicle over a network, wherein the route segment information includes one or more route segments of a route to a destination and estimated entrance times, each of the entrance times being associated with one of the route segments and representing a time the first autonomous driving vehicle enters the route segment;
determining whether the first autonomous driving vehicle is within a specific route segment based on an entrance time associated with the specific route segment and a current location of the first autonomous driving vehicle; and
if the first autonomous driving vehicle is within the specific route segment, sending a request to invite the first autonomous driving vehicle to join a vehicle group of one or more autonomous driving vehicles traveling in a same route segment as the first autonomous driving vehicle, wherein the vehicle group is one of a plurality of vehicle groups that were determined based on route segment information received from a plurality of autonomous driving vehicles.

7. The machine-readable medium of claim 6, wherein the operations further comprise:
determining whether the first autonomous vehicle has left the specific route segment; and
if the first autonomous vehicle is no longer within the specific route segment, sending a request to the first autonomous vehicle to remove the first autonomous vehicle from the vehicle group.

8. The machine-readable medium of claim 7, wherein the operations further comprise:
receiving a message from a first passenger of the first autonomous vehicle over the network; and
forwarding the message to a second passenger of the second autonomous vehicle over the network.

9. The machine-readable medium of claim 6, wherein the operations further comprise:
creating the vehicle group if there is no vehicle group currently associated with the specific route segment; and
terminating the vehicle group if there is no autonomous vehicle currently associated with the vehicle group.

10. The machine-readable medium of claim 6, wherein the operations further comprise:
receiving a message from a first passenger of the first vehicle to be sent to a second passenger of a second vehicle of the vehicle group;
determining whether the message is an offensive message; and
removing the first passenger from the vehicle group in response to determining that the message is offensive.

11. A data processing system, comprising:
a processor; and
a memory coupled to the processor to store instructions, which when executed by the processor, cause the processor to perform operations for forming a vehicle group for autonomous driving vehicles, the operations including:
receiving route segment information from a first autonomous driving vehicle over a network, wherein the route segment information includes one or more route segments of a route to a destination and estimated entrance times, each of the entrance times being associated with one of the route segments and representing a time the first autonomous driving vehicle enters the route segment;
determining whether the first autonomous driving vehicle is within a specific route segment based on an entrance time associated with the specific route segment and a current location of the first autonomous driving vehicle; and
if the first autonomous driving vehicle is within the specific route segment, sending a request to invite the first autonomous driving vehicle to join a vehicle group of one or more autonomous driving vehicles traveling in a same route segment as the first autonomous driving vehicle, wherein the vehicle group is one of a plurality of vehicle groups that were determined based on route segment information received from a plurality of autonomous driving vehicles.

12. The system of claim 11, wherein the operations further comprise:
determining whether the first autonomous vehicle has left the specific route segment; and
if the first autonomous vehicle is no longer within the specific route segment, sending a request to the first autonomous vehicle to remove the first autonomous vehicle from the vehicle group.

13. The system of claim 12, wherein the operations further comprise:
receiving a message from a first passenger of the first autonomous vehicle over the network; and
forwarding the message to a second passenger of the second autonomous vehicle over the network.

14. The system of claim 11, wherein the operations further comprise:

creating the vehicle group if there is no vehicle group currently associated with the specific route segment; and terminating the vehicle group if there is no autonomous vehicle currently associated with the vehicle group.

15. The system of claim 11, wherein the operations further comprise:

receiving a message from a first passenger of the first vehicle to be sent to a second passenger of a second vehicle of the vehicle group;

determining whether the message is an offensive message; and removing the first passenger from the vehicle group in response to determining that the message is offensive.

16. A computer-implemented method for operating an autonomous vehicle, the method comprising:

obtaining an itinerary responsive to an input destination, the itinerary including a route to the input destination of a first autonomous driving vehicle, the route having a plurality of points of interest;

segmenting the route into a plurality of route segments based on the points of interest and location and map information and, estimating an entrance time of the autonomous vehicle entering into each of the plurality of route segments;

transmitting route segment information, including the plurality of route segments and entrance times, to a remote server over a network, wherein the remote server receives route segment information from a plurality of autonomous vehicles over the network;

receiving a vehicle group identifier (ID) identifying a group of one or more vehicles that are travelling in a same route segment as the first autonomous driving vehicle, from the remote server, wherein the remote server determined a plurality of vehicle groups based on the route segment information received from the plurality of autonomous vehicles and the group of one or more vehicles that are travelling in the same route segment as the first autonomous driving vehicle is determined based an entrance time associated with a specific route segment and a current location of the first autonomous driving vehicle; and in response to the vehicle group ID, joining the group of one or more vehicles that are travelling in the same route segment as the first autonomous driving vehicle, to allow passengers of the one or more vehicles to communicate with each other.

17. The method of claim 16, wherein passengers of the vehicles in the group communicate with each other via the remote server over the network.

18. The method of claim 16, further comprising:

receiving media content from the remote server, wherein the media content was identified and rendered by the remote server based on a point of interest associated with the route segment corresponding to the group of vehicles; and presenting the media content to a passenger of the autonomous vehicle.

* * * * *